(12) United States Patent
McKevitt et al.

(10) Patent No.: US 9,002,841 B2
(45) Date of Patent: Apr. 7, 2015

(54) FEED VALIDATOR

(75) Inventors: Paul John McKevitt, Dublin (IE); Gary Thomas Martin McLaughlin, Antrim (IE); Edwin Anthony O'Sullivan, Kildare (IE); Igor Klimchuk, Dublin (IE)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 12/576,607

(22) Filed: Oct. 9, 2009

(65) Prior Publication Data

US 2011/0087638 A1    Apr. 14, 2011

(51) Int. Cl.
   *G06F 7/00* (2006.01)
   *G06F 17/30* (2006.01)

(52) U.S. Cl.
   CPC .................................. *G06F 17/3089* (2013.01)

(58) Field of Classification Search
   USPC .................................. 707/602, 601, 604, 736
   See application file for complete search history.

(56) References Cited

U.S. PATENT DOCUMENTS

| | | | |
|---|---|---|---|
| 7,798,417 B2 * | 9/2010 | Snyder et al. .................. | 235/494 |
| 8,316,005 B2 * | 11/2012 | Moore ........................... | 707/707 |
| 8,521,740 B2 * | 8/2013 | Henderson et al. ............ | 707/737 |
| 2004/0225749 A1 * | 11/2004 | Pavlik et al. .................... | 709/245 |
| 2005/0240596 A1 * | 10/2005 | Worthen et al. ................. | 707/10 |
| 2006/0116994 A1 * | 6/2006 | Jonker et al. ....................... | 707/3 |
| 2007/0061713 A1 * | 3/2007 | Chidlovskii et al. ........... | 715/523 |
| 2007/0100836 A1 * | 5/2007 | Eichstaedt et al. .............. | 707/10 |
| 2007/0168367 A1 | 7/2007 | Dickinson | |
| 2007/0198526 A1 | 8/2007 | Pitkow | |
| 2007/0234211 A1 * | 10/2007 | Henderson ..................... | 715/700 |
| 2007/0240039 A1 * | 10/2007 | Hosotsubo ..................... | 715/517 |
| 2008/0010294 A1 * | 1/2008 | Norton et al. ................... | 707/10 |
| 2008/0016502 A1 * | 1/2008 | Henderson et al. ........... | 717/143 |
| 2008/0046471 A1 | 2/2008 | Moore | |
| 2008/0065982 A1 * | 3/2008 | Evanchik et al. ............. | 715/255 |
| 2008/0086476 A1 | 4/2008 | Shrader | |
| 2008/0147621 A1 | 6/2008 | Newman | |
| 2008/0243874 A1 * | 10/2008 | Suthar et al. .................. | 707/100 |
| 2009/0083294 A1 * | 3/2009 | Gao et al. ....................... | 707/100 |
| 2009/0106234 A1 * | 4/2009 | Siedlecki et al. ................. | 707/5 |
| 2010/0235505 A1 * | 9/2010 | Gupta et al. .................... | 709/225 |

OTHER PUBLICATIONS

Validome, Validator for Atom and RSS Feed, Feb. 21, 2007, 1 page, http://www.validome.org/rss-atom/.

Makoto Murata and Hisashi Miyashita, Full Validation of Atom Feeds Containing Extensions, May 5, 2008, 10 pages, http://www.asahi-net.or.jp/-eb2m-mrt/atomextensions/atomextensions.html.

W3C, Feed Validation Service, Aug. 10, 2009, 3 pages, http://validator.w3.org/feed/about.html.

\* cited by examiner

*Primary Examiner* — Eliyah S Harper (74) *Attorney, Agent, or Firm* — Dave Ream; Alin Corie; Micky Minhas (57) ABSTRACT

Methods, systems, and computer-readable media for generating feed schemas and validating feeds are provided. A user interface may be provided that displays the schema in one pane, while providing drop-down menus for defining new schema nodes in a separate pane. An interface for validating the schema may show the feed as it will be displayed on a webpage utilizing the feed.

12 Claims, 12 Drawing Sheets

FEED VALIDATOR

BACKGROUND

Websites may display content that is drawn from one or more feeds provided by content providers. Examples of feed formats used today include RSS feed and Atom. The feed may be provided according to a schema used by the website to consume the feed content. A single website may utilize multiple schemas to display different types of content. When the schema used to provide the feed does not match the schema used by the website an error will result.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention generally relate to a system and method for creating feed schemas and validating feeds against the created schemas. Initially, a schema is created for a particular content display where the content is provided by a feed. In embodiments of the present invention, the schema can be created through a user interface generated by a schema creation component. The user interface may allow the user to define schema nodes through drop-down controls in a first pane, while displaying the nodes in the schema in a second pane. Once generated the schema is stored for later use.

A validation tool may also be provided to validate a feed against a specific schema. A user interface may be provided that allows the user to designate the location of the feed and the schema against which the feed should be validated. The user may be asked to provide a format in which the content may be displayed. If appropriate the user may be asked to select a subset of fields to display upon validation. The feed may be validated. Error messages are generated if the validation fails. On the other hand, if the validation is successful, then the content will be displayed as it would appear to a user of the website displaying the feed.

BRIEF DESCRIPTION OF THE DRAWINGS

Embodiments of the invention are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention generally relate to a system and method for creating feed schemas and validating feeds against the created schemas. Initially, a schema is created for a particular content display where the content is provided by a feed. In embodiments of the present invention, the schema can be created through a user interface generated by a schema creation component. The user interface may allow the user to define schema nodes through drop-down controls in a first pane, while displaying the nodes in the schema in a second pane. Once generated the schema is stored for later use.

A validation tool may also be provided to validate a feed against a specific schema. A user interface may be provided that allows the user to designate the location of the feed and the schema against which the feed should be validated. The user may be asked to provide a format in which the content may be displayed. If appropriate the user may be asked to select a subset of fields to display upon validation. The feed may be validated. Error messages are generated if the validation fails. On the other hand, if the validation is successful, then the content will be displayed as it would appear to a user of the website displaying the feed.

Accordingly, in one embodiment, one or more computer-readable media having computer-executable instructions embodied thereon for performing a method of validating a feed against a schema is provided. The method includes receiving input describing a feed location for the feed that is to be validated. The method also includes receiving a selection of a schema against which the feed is to be validated. The method further includes receiving a request to validate the feed against the schema. The method also includes determining that the feed conforms to requirements of the schema, thereby validating the feed. The method also includes displaying at least a portion of feed content from the feed in a representation that is based on a display template that utilizes the schema, thereby indicating to a user that the feed has been successfully validated against the schema.

In another embodiment, a method of creating a schema that is used to specify an organizational structure for a feed is provided. The method includes displaying a schema-creation user interface that includes a specification portion through which a schema is created and a schema-representation that displays a hierarchical depiction of the schema. The method also includes receiving, through the specification portion, an instruction to add an element to the schema. The method further includes displaying the hierarchical depiction of the schema with the element.

In yet another embodiment, One or more computer-readable media having computer-executable instructions embodied thereon that when executed perform a method of creating and validating schema for a feed are provided. The method includes displaying a schema-creation user interface that includes a specification portion through which a schema's attributes are received. The method also includes receiving, through the specification portion, attributes of the schema. The method further includes receiving an instruction to save the schema. The method further includes receiving input describing a feed location for the feed that is to be validated against the schema. The method also includes receiving a request to validate the feed against the schema. The method further includes determining that the feed conforms to requirements of the schema, thereby validating the feed. The method also includes displaying a validation confirmation.

Having briefly described an overview of embodiments of the invention, an exemplary operating environment suitable for use in implementing embodiments of the invention is described below.

Exemplary Operating Environment

Figure 1:
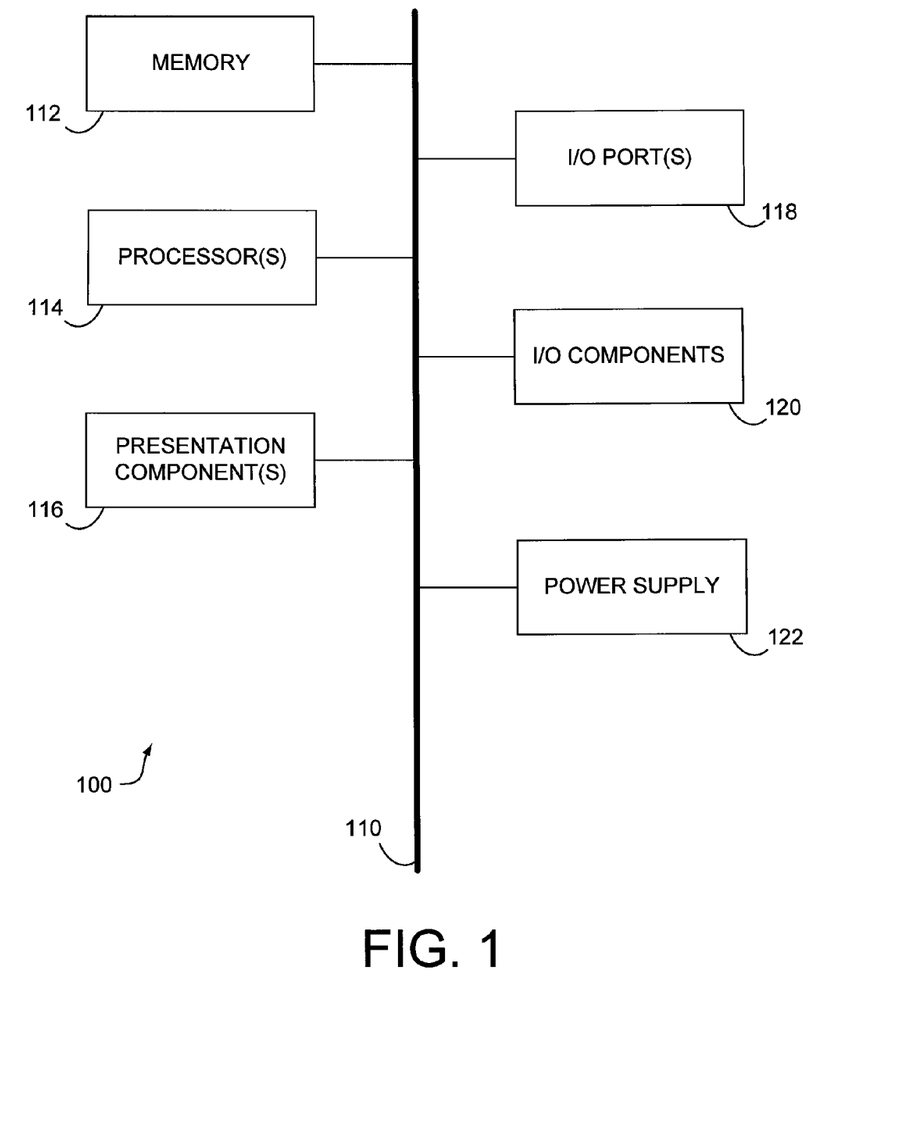
FIG. 1 is a block diagram of an exemplary computing environment suitable for implementing embodiments of the invention.

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120t. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-readable media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Figure 2:
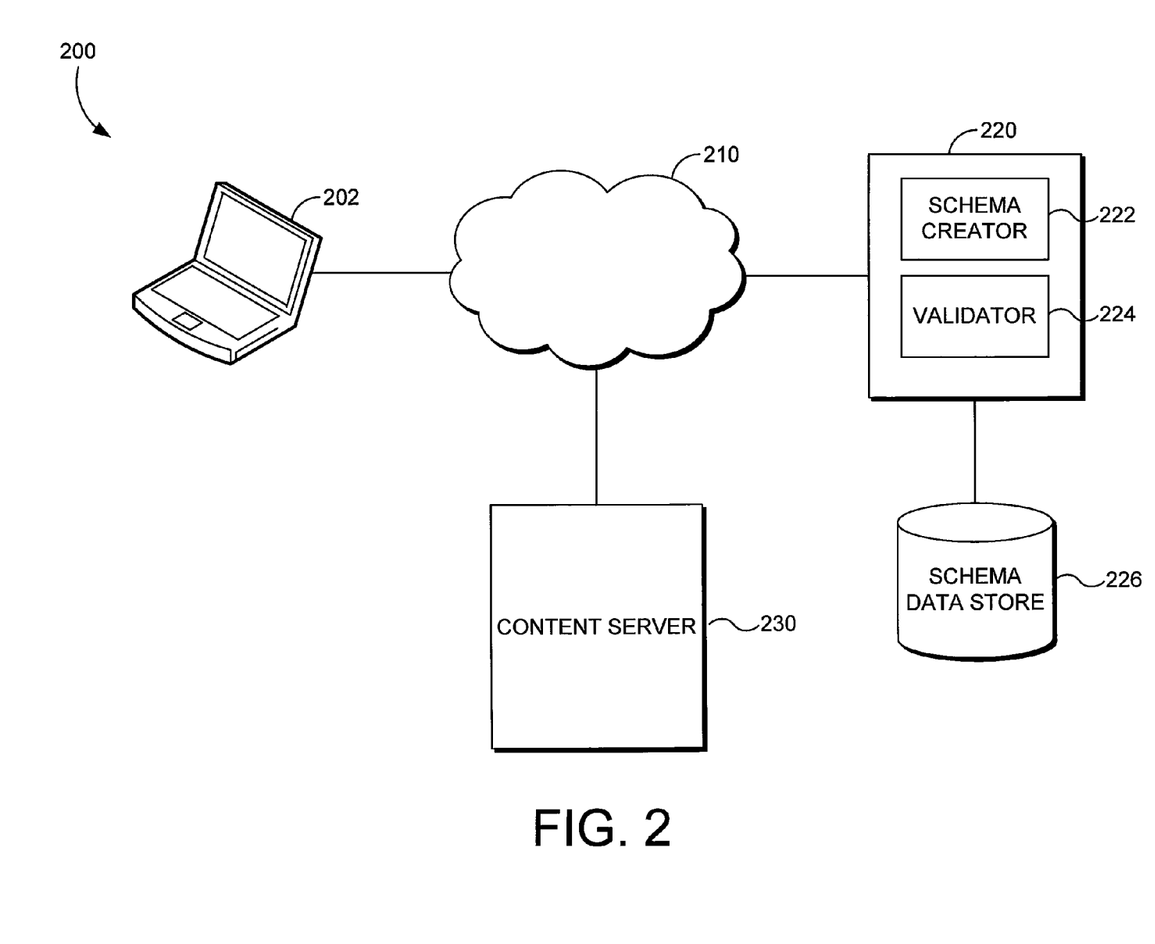
FIG. 2 is a block diagram of an exemplary computing system architecture of a search component suitable for disambiguating a query, in accordance with an embodiment of the present invention.

Embodiments of the present invention may be practiced in a communications network providing service to devices communicatively coupled to the communications network. An illustrative operating environment 200 that contains a few of the components within such a communications network is shown in FIG. 2. The operating environment 200 includes a computing device 202, a network 210, a content aggregator 220, a schema creator 222, a validator 224, a schema data store 226, and a content provider 230. The components shown in FIG. 2 are a few of the components that embodiments of the invention may interact with during operation. The components shown in FIG. 2 are described in brief and with an emphasis on function for the sake of simplicity. The components within FIG. 2 are communicatively coupled to each other in a manner appropriate for carrying out their respective function within the illustrative operating environment 200. Embodiments of the present invention are not limited by the communication protocols or formats used to facilitate communications between components; those mentioned are for the sake of enablement and are not meant to be limiting.

The computing device 202 may be similar to computing device 100 explained previously with reference to FIG. 1. A user may utilize the computing device 202 to access content over network 210. The content may include a web page or other content provided by content aggregator 220 or content provider 230. Of course, the computing device 202 may access content from any number of sources not shown.

Network 210 may include one or more mobile networks, one or more packet-based networks, including the Internet, and the public-switched telephone network ("PSTN"). The various components within network 210 may be owned and/or operated by multiple entities, commercial or otherwise. Network 210 is configured to transmit a variety of communication formats including phone calls, emails, text messaging, faxes, instant messaging, pages, voice mails, photographs, audio files, web pages, videos, movies, TV shows, calendar reminders, task reminders, advertisements, and other files containing communicative content.

The content server 230 stores media content and communicates it to a user upon receiving a request for the media. The content server 230 includes a computing device that may include a CPU, short-term memory, long-term memory, and one or more network interfaces. The network interface is used to connect to a LAN, WAN (including the Internet), or other variety of communications networks. The network interface to the WAN or LAN could be wired, wireless, or both. In one embodiment, the content server 230 facilitates transmission of media content (e.g. movies, web pages, videos, MP3s, advertisements, etc.) to computing device 202 or mobile device 206. The content server 230 transmits the media content over the packet-switched network 210. The content server 230 may also host web pages that are transmitted to a requesting device. Content server 230 may be affiliated with a content provider that produces, generates, or maintains the media content on the content server 230. In one embodiment, the content server 230 is an ad server.

The content aggregator 220 may include one or more computing devices, each of which may be similar to computing device 100 described previously with reference to FIG. 1. The content aggregator 220 may provide a search engine or other web page that provides links to content provided by others, such as content server 230. The content aggregator 220 may also provide content of its own and combine it with other's content. The content aggregator 220 operates the schema creator 222 and the validator 224. Both the schema creator 222 and the validator 224 help the content aggregator 220 receive content in the appropriate format to display.

The schema creator 222 provides a user interface through which a schema may be created. The schema creator 222 will be explained in more detail subsequently with reference to the interface shown in FIG. 11. The schema specifies an organization for data in the content feeds. The schema may include multiple elements and specify attributes of the elements. Data in the content feed that corresponds to the element must conform to the attributes. For example, if the attributes for the element age require an integer between 0 and 200, then the data in the age element within the feed should be an integer between 0 and 200. Developers for the content aggregator 220 may use the schemas to specify the format in which data in a content feed should be sent.

The newly created schema may be saved in schema data store 226. The schema data store 226 includes computer-storage media and one or more data structures suitable for storing the schemas. The schema data store 226 is communicatively coupled to the schema creator 222 and the validator 224. The schema data store 226 may be located remotely or locally with reference to the one more computing devices included in the content aggregator 220. Creating a schema data store 226 allows the schemas to be reused as needed. They may also be shared with content providers from the schema data store 226.

The validator 224 validates a feed against a schema within the schema data store 226 or in some other location. In one embodiment, an interface is provided for content providers to validate their content feed before they communicate the content feed to the content aggregator 220. Initially, the validator receives a feed location, which may be an HTTP address corresponding to a location on the content server 230. The validator 224 also receives the selection of a schema. Upon receiving the selection of a feed and a schema, the validator 224 validates the feed against the schema. If the feed conforms to the requirements of the schema then the person seeking to validate the schema will be informed that the feed has been validated. Interfaces that may be generated by the validator 224 are explained in more detail with reference to FIGS. 3-10.

Figure 3:
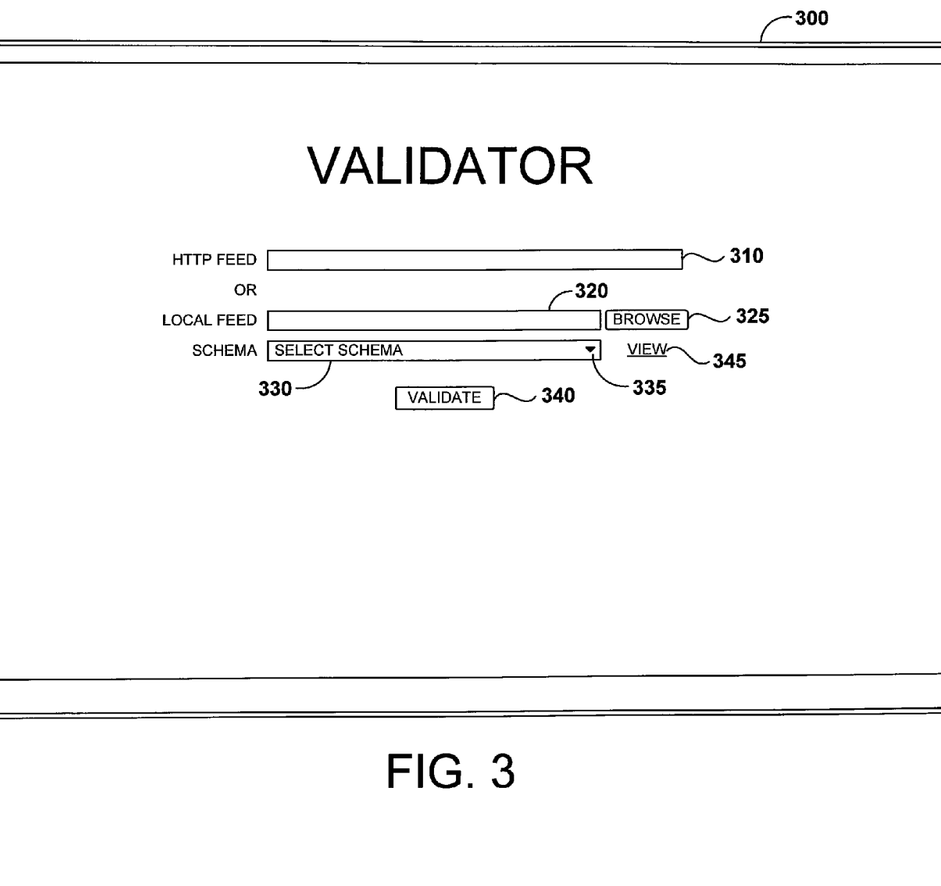
FIG. 3 is a diagram of a start page for the validator in accordance with an embodiment of the present invention.

Turning now to FIG. 3, a start page for the validator is shown, in accordance with an embodiment of the present invention. In this embodiment, the validator may be accessed through start interface 300. Start interface 300 may be communicated as part of a web page displayed on the Internet or generated locally on a computer display communicatively coupled to the computing device on which the validator is operating. The start interface 300 includes two options for designating a feed to be validated. In box 310, an HTTP address may be entered from which the feed may be retrieved. The second option allows a user of the validator to select a file location from a directory. The user pushes the browse button 325 to open a navigation window through which the feed location may be selected. Once the feed location is selected, it will be displayed in location display box 320.

Continuing with FIG. 3, the schema input interface 335 allows the user to select a schema against which the feed is validated. In the embodiment shown, schema input interface 335 is a drop-down menu box. In one embodiment, the menu box may scroll to the schema starting with letters entered by the user. Once selected, the schema is displayed in the display portion 330 of the input interface 335.

Once the feed location is selected and the schema is selected, the user may push the validate button 340 to validate the feed against the selected schema. In one embodiment, a user may view the schema before or after validation by selecting the view button 345.

Figure 4:
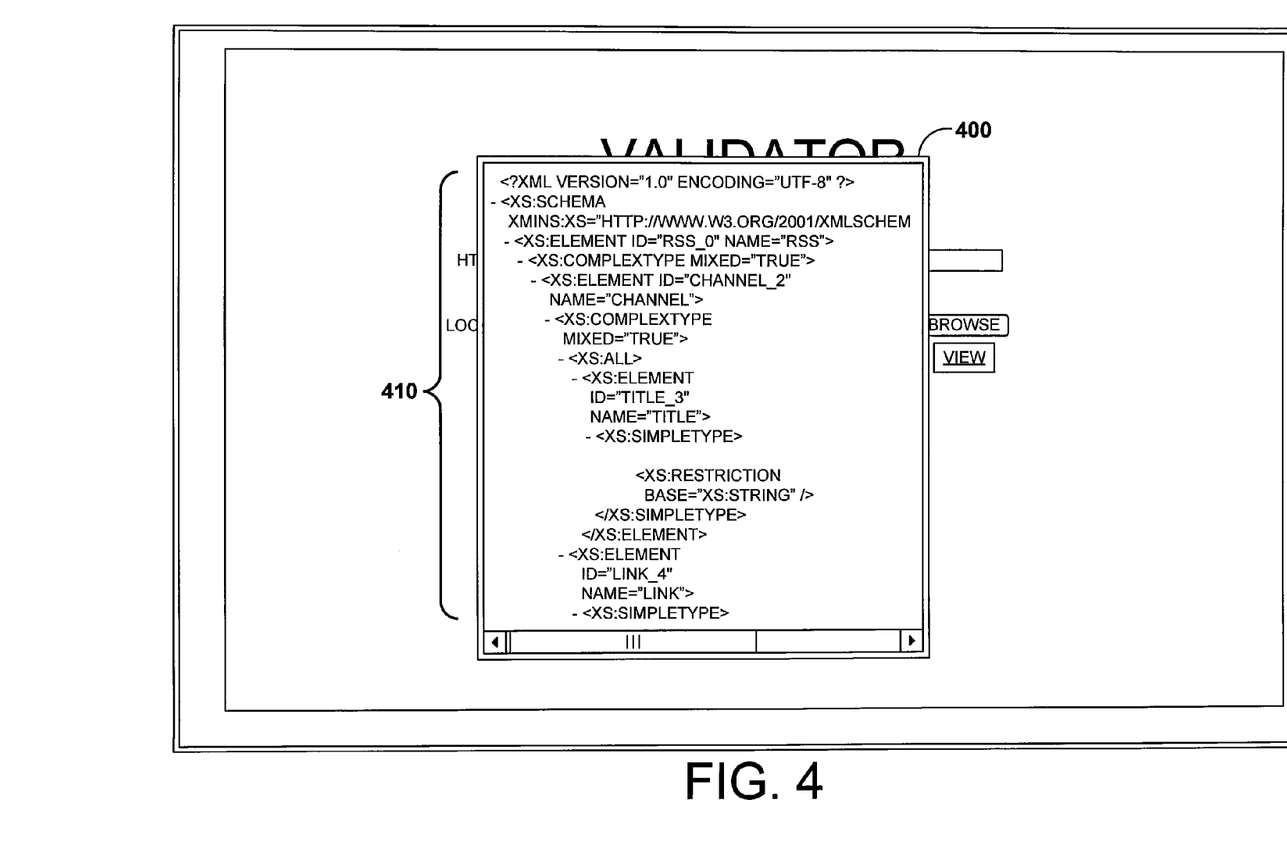
FIG. 4 is a diagram of a schema view in accordance with an embodiment of the present invention.

Turning now to FIG. 4, a schema view 400 is shown according to an embodiment of the present invention. The schema view 400 shows a text version of the schema 410. The schema view 400 may be shown in a pop-up window or in a portion of start interface 300, which is modified to show the schema view 400. The schema view 400 may be activated by a user selecting the view button 345.

Figure 5:
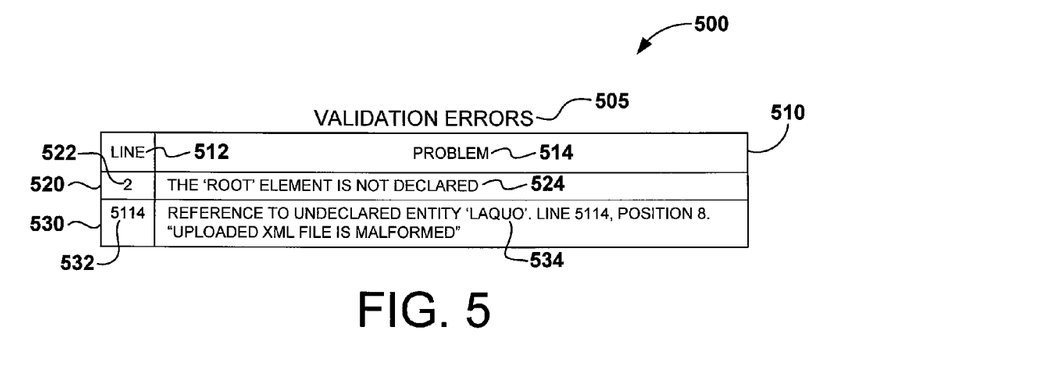
FIG. 5 is a diagram of an error view in accordance with an embodiment of the present invention.
Figure 6:
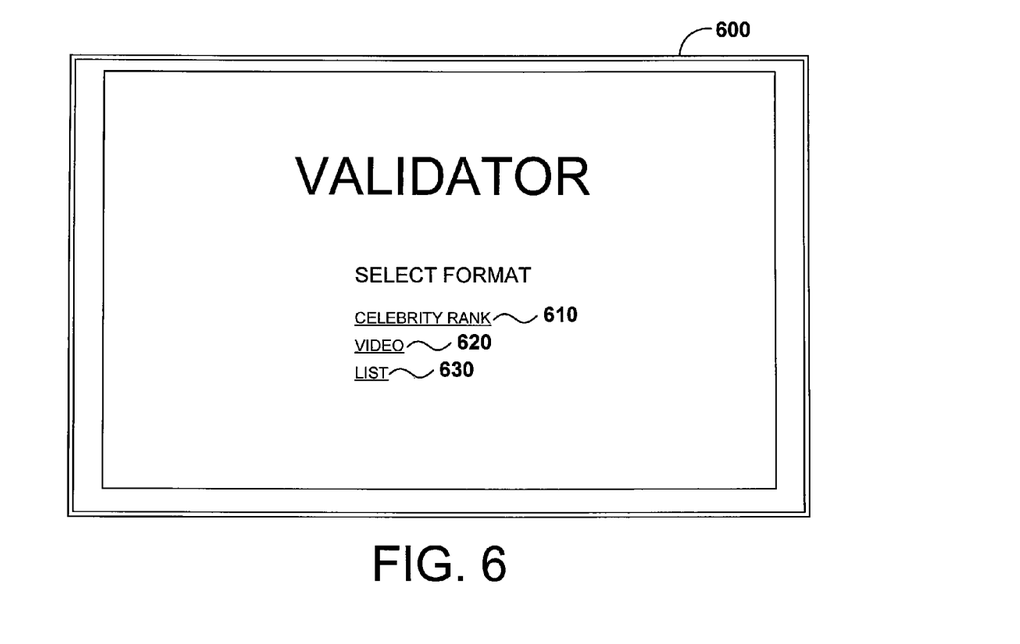
FIG. 6 is a diagram of a template-selection interface in accordance with an embodiment of the present invention.

Upon selecting the validate button 340, the validator will attempt to validate the feed against the selected schema. The subsequent display shown to the user depends on the result of the validation. If the validation is not successful and errors are found, the user will be shown the error view 500, as shown in FIG. 5. If the validation is successful, the user may be asked to select a display template so that the validated feed may be shown. A selection screen is shown in FIG. 6.

The error view 500 includes a list of validation errors 505. The list starts with a heading 510 that identifies the columns as describing the line 512 on which the error occurs and a description 514 of the problem. The first error 520 occurs on line 522 and has the description 524 "the root element is not declared." The second error 530 occurs on line 5114 532 and includes the description 534 of "reference to undeclared entity 'laquo' line 5114, position 8. Uploaded XML file is malformed." The users may fix these errors and return to the beginning of the validation process.

Upon determining that the validation is successful, the user is asked to select a display template from template-selection interface 600. Template-selection interface 600 includes three display templates. Display templates include celebrity rank 610, video 620, and list 630. The celebrity-rank display template 610 is a particular format for displaying celebrity information. The video template 620 displays one or more video feeds and accompanying descriptions. The list template 630 is a generic display template that displays numerous kinds of feeds in a list format. Embodiments to the present invention are not limited to these three display templates. These three templates are just shown for the sake of illustration. Upon selecting a display template, the content from the feed will be displayed on the screen utilizing the selected display template.

Figure 7:
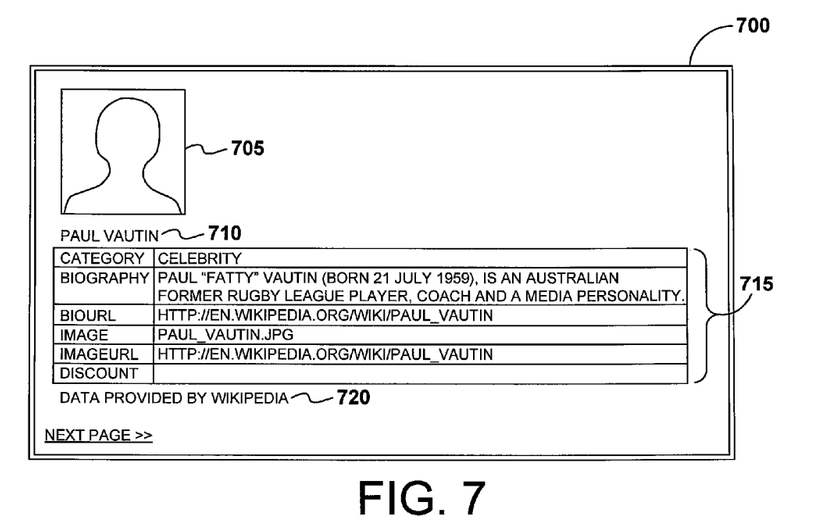
FIG. 7 is a diagram of a validation display generated with the celebrity list display template in accordance with an embodiment of the present invention.

Turning now to FIG. 7, an exemplary validation display 700 generated with the celebrity list display template is shown, in accordance with an embodiment of the present invention. The validation display 700 includes a photograph 705, a name of the celebrity 710, descriptive information 715, and the source of the feed 720. The validation display 700 shows the feed as it would appear on a website utilizing the feed and the celebrity-rank display template 610.

Figure 8:
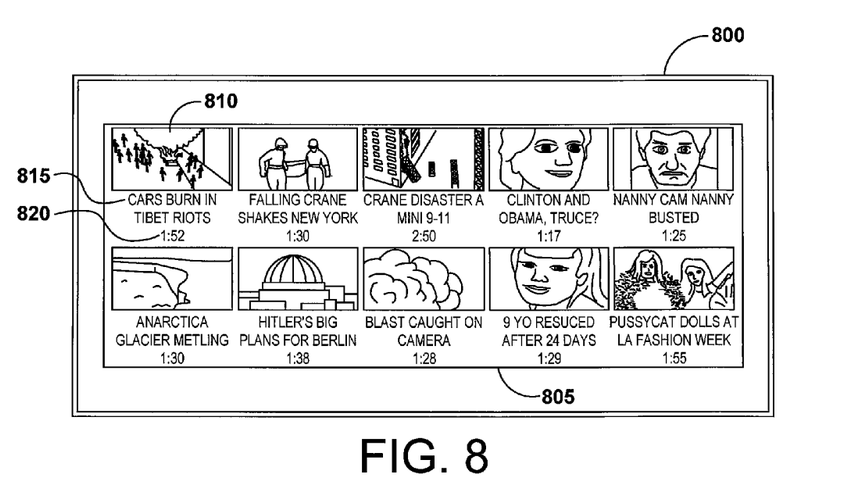
FIG. 8 is a diagram of a validation display generated with the video display template in accordance with an embodiment of the present invention.

Turning now to FIG. 8, a validation display 800 generated with the video display template is shown, in accordance with an embodiment of the present invention. The validation display 800 includes ten video previews 805. Each video preview includes a visual depiction 810 of a portion of the video, a title for the video 815, and run time 820 for the video.

Figure 9:
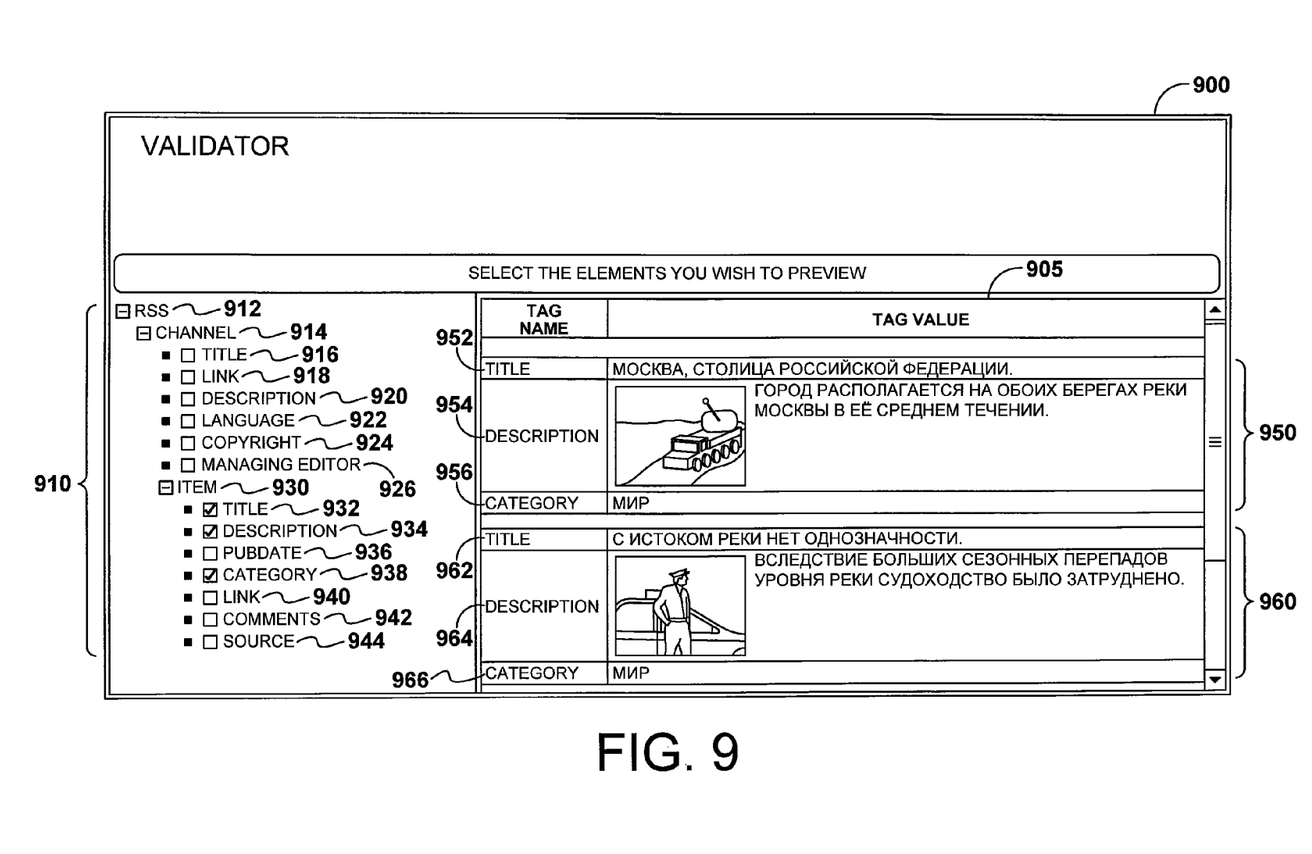
FIG. 9 is a diagram of a validation-display creation interface in accordance with an embodiment of the present invention.

Turning now to FIG. 9, a validation-display creation interface 900 is shown, according to an embodiment of the present invention. The validation-display creation interface 900 includes a what-you-see-is-what-you-get display portion 905 and a content-selection interface 910. The content-selection interface 910 allows the user to select fields within the feed to show on the display portion 905 of the interface 900. The content selection interface 910 shows multiple fields that are available within the content feed. The fields shown include RSS 912, channel 914, title 916, link 918, description 920, language 922, copyright 924, managing editor 926, item 930, title 932, description 934, pub date 936, category 938, link 940, comments 942, and source 944. Each of these fields has a selection box adjacent to the description of the field. Selecting the selection box next to the field description will cause the associated field to be shown in a display portion 905 of the interface 900. In the embodiment shown, the title field 932, the description field 934, and the category field 938 are selected. As can be seen in the display portion 905, each of the feed records includes data from these fields. For example, record 950 includes a title 952, a description 954, and the category 956. Similarly, the record 960 includes a title 962, a description 964, and a category 966. Additional fields could be added to the display portion 905 by selecting the box adjacent to the field. In one embodiment, the display portion 905 is dynamically updated as new fields are selected.

The validation interface 900 may be described as a generic display template. The validation interface 900 is generic in a sense that it allows feeds not fitting into a specific template to be previewed. The generic template also gives the user the ability to customize the display by selecting the fields to be shown in the display portion 905. The display portion 905 essentially shows the selected items in a list.

Figure 10:
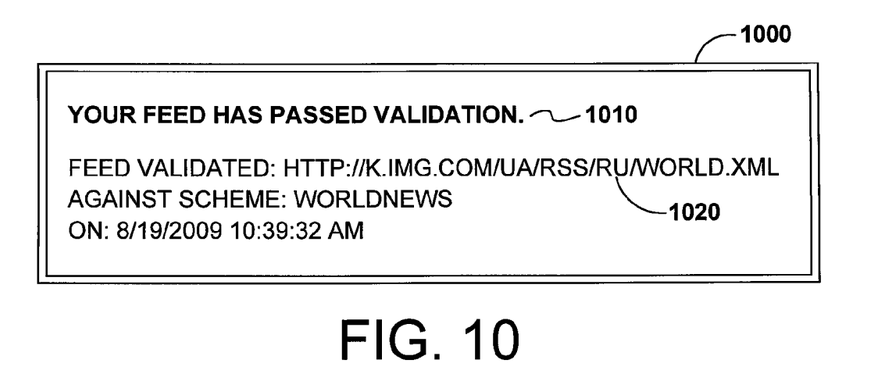
FIG. 10 is a diagram of a validation-confirmation screen, in accordance with an embodiment of the present invention.

Turning now to FIG. 10, upon successful validation of a feed, a validation-confirmation interface 1000 may be shown.

Validation-confirmation interface 1000 includes a message stating that the selected feed has passed validation 1010 as well as details of the feed schema and date on which the feed was validated 1020.

Figure 11:
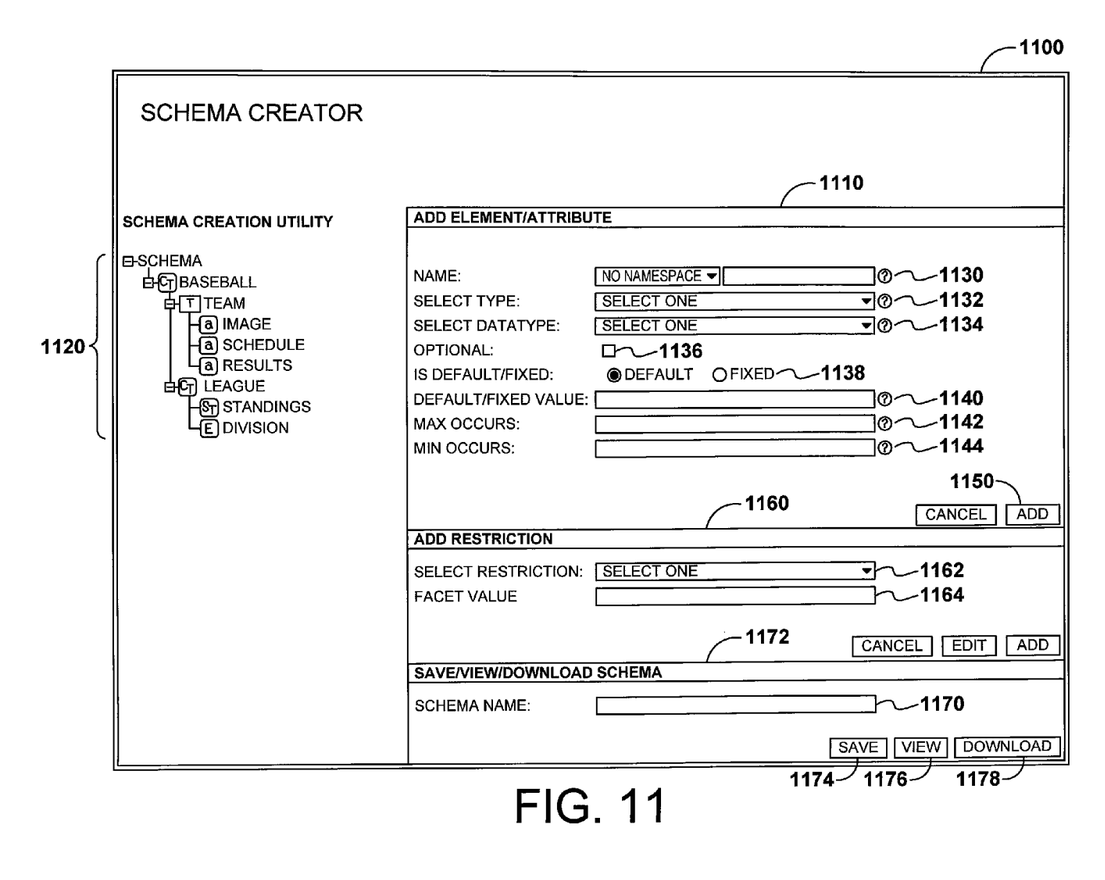
FIG. 11 is a diagram of a schema-creator interface, in accordance with an embodiment of the present invention.

Turning now to FIG. 11, a schema-creation interface 110 is shown, according to an embodiment of the present invention. The schema-creator interface 1100 interacts with the schema creator 222 to allow the user to create a new schema or modify an existing schema. The schema-creator interface 1100 includes an schema specification portion 1110 and a schema representation portion 1120. The schema specification portion 1110 allows the user to add elements to a schema and specify the element's attributes. The schema-representation portion 1120 shows a representation of the schema being created. In one embodiment, the schema representation is shown in a hierarchical representation. In one embodiment, the hierarchical representation is updated in real time as new elements are added through schema specification portion 1110.

The schema specification portion 1110 includes a naming field 1130 through which the schema or an element within the schema may be named. The named space for the name may be selected using a drop-down menu. Additional features of an element may be specified through the other inputs shown. The element type may be selected through a drop down box through the type interface 1132. The data type may be specified through a drop down box in the data type interface 1134. The element may be designated as optional by checking the optional box 1136. Whether the element includes a default or fixed value may be specified by radio buttons 1138. A default/fixed value may be input into box 1140. The max occurrences may be designed in box 1142 and the minimum occurrences may be designated in box 1144. Upon completing the information in the previously described fields, pushing the add button 1150 causes that element to be added to the schema. As described previously, upon pushing the add button 1150 the additional schema element may appear in its appropriate place within the hierarchical representation shown in representation portion 1120.

The schema specification portion 1110 also includes an add restriction component 1160. The restriction may be specified by selecting a restriction in restriction selection box 1162. A value relating to the restriction may be added in facet value box 1164 when appropriate. Finally, a save as input 1170 allows the user to save the newly created schema. A schema name may be designated in schema name box 1172. The schema may be saved by selecting the save button 1174, viewed by selecting the view button 1176, or downloaded to a designated location by pushing the download button 1178.

Figure 12:
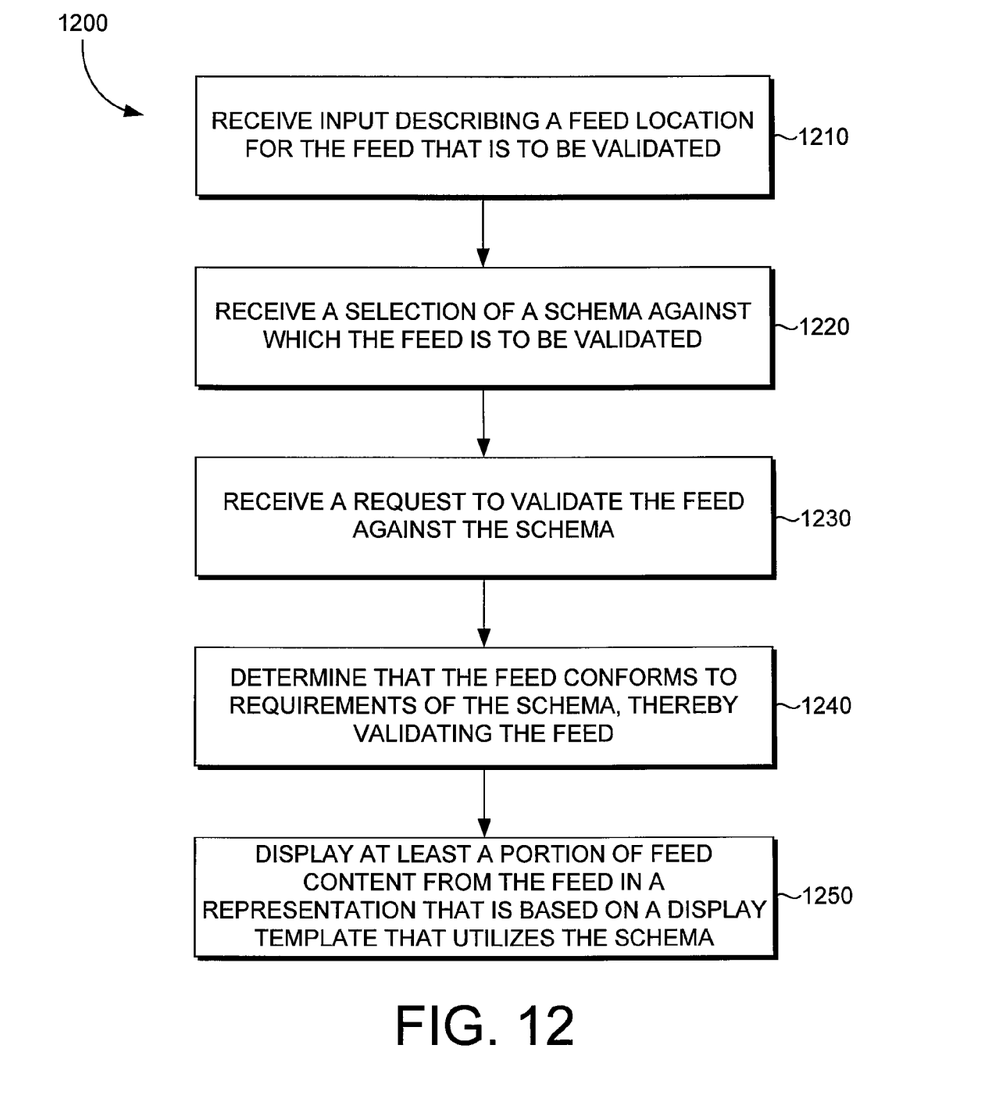
FIG. 12 is a flow chart showing a method of validating a feed against a schema, in accordance with an embodiment of the present invention.

Turning now to FIG. 12, a method 1200 of validating a feed against a schema is shown, according to an embodiment of the present invention. In one embodiment, the method 1200 is performed by a computing device executing one or more computer-executable instructions embodied on one or more computer-readable media. The feed may be an RSS feed, an Atom feed, or other feed used to convey information displayed through a display template. At Step 1210, input describing a feed location for the feed that is to be validated is received. As described previously, the input may be received by a user typing an HTTP address into a user interface. In another embodiment, the location is described by selecting a location from a menu. In either case, the location may be local or remote to the computing device performing the method 1200.

At Step 1220, a selection of a schema against which the feed is to be validated is received. The schema may be selected through a look-up menu. A schema may also be selected by entering the address or location of the schema in an interface. Other methods of selecting a schema against which the feed is to be validated are also possible.

At Step 1230, a request to validate the feed against the schema is received. In one embodiment, the request includes a user pushing a button through a validation interface. At Step 1240, the feed is determined to conform to requirements of the schema. Accordingly, the feed is validated. In one embodiment, if the feed is not validated, error messages may be sent to the user. The error messages may specify the line of feed that did not conform with the requirements of the schema as well as a description of the error.

At Step 1250, at least a portion of the feed content from the feed is displayed in a representation that is based on a display template that utilizes the schema. Displaying a portion of the feed content provides an indication to the user the feed has been successfully validated against the schema. In addition, a simple validation message may be presented to the user indicating the feed has been validated. Other information, such as the date of validation, may also be displayed. The representation may be a what-you-see-is-what-you-get representation of the feed as it will appear displayed on a content aggregator's website. In one embodiment, the method further includes receiving input to view the schema. In response to receiving the request to view the schema, a textural representation of the schema is displayed in the same window or in a different window.

Figure 13:
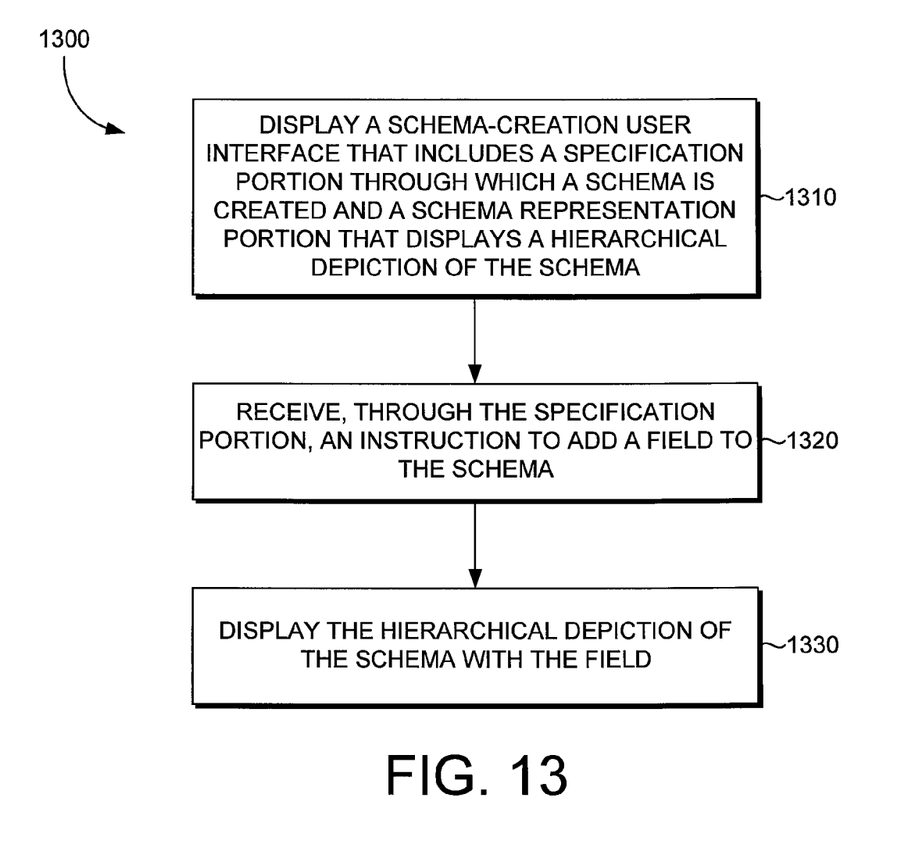
FIG. 13 is a flow chart showing a method of creating a schema that is used to specify an organizational structure for a feed, in accordance with an embodiment of the present invention.

Turning now to FIG. 13, a method 1300 of creating a schema that is used to specify an organizational structure for a feed is shown, in accordance with an embodiment of the present invention. In one embodiment, the method is executed by a computing device that is executing computer-executable instructions that cause the computing device to perform method 1300 when executed. At Step 1310, a schema-creation user interface is displayed. The user interface includes a specification portion through which a schema is created and a schema-representation portion that displays a hierarchical depiction of the schema. The user interface may be displayed through a display device that is communicatively coupled to the computing device on which method 1300 is running. In one embodiment, the display device is a separate computing device accessing the computing device on which method 1300 is running over a network.

At Step 1320, an instruction to add an element to the schema is received through the specification portion. In one embodiment, additional attributes of the element are specified by the user through the specification portion of the schema-creation user interface. In one embodiment, several of the attributes are specified through drop-down menus that present a selection of attribute values corresponding to an attribute of the schema element. At step 1330, the hierarchical depiction of the schema is displayed with the field that has just been added through the specification portion. In one embodiment, the hierarchical depiction of the schema is continuously updated as additional elements are added to the schema. In one embodiment, the elements in the hierarchical depiction are selectable. Selecting an element may cause the element's attributes to be displayed in the specification portion of the interface through which the attributes may be updated.

Figure 14:
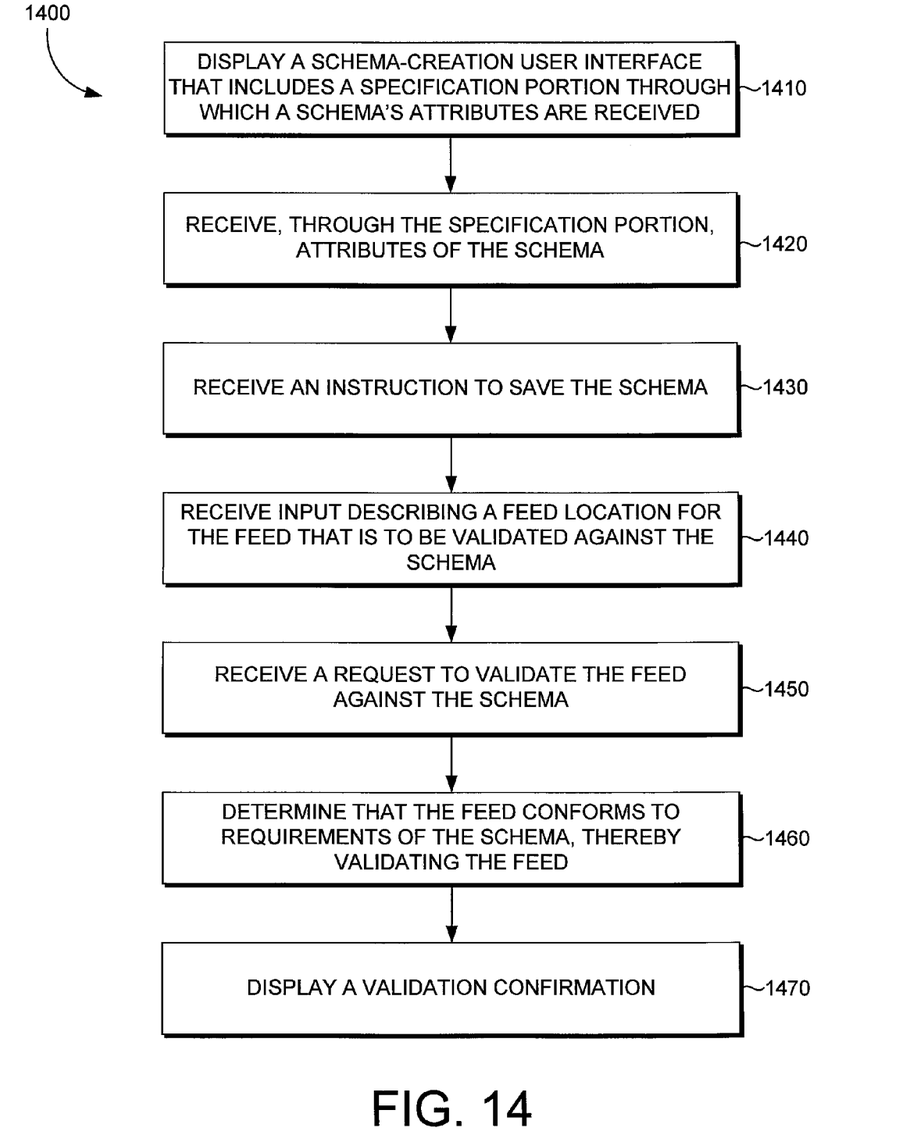
FIG. 14 is a flow chart showing a method of creating and validating schema for a feed, in accordance with an embodiment of the present invention.

Turning now to FIG. 14, a method 1400 of creating and validating schema for a feed is shown, according to an embodiment of the present invention. In one embodiment, the method 1400 is performed by a computing device executing one or more computer-executable instructions embodied on one or more computer-readable media. The feed may be an RSS feed, an Atom feed, or other feed used to convey information displayed through a display template.

At Step 1410, a schema-creation user interface is displayed. The user interface includes a specification portion through which a schema's attributes are received. The user interface may also include a hierarchical representation portion that displays a hierarchical depiction of the schema. The user interface may be displayed through a display device that is communicatively coupled to the computing device on which method 1300 is running. In one embodiment, the display device is a separate computing device accessing the computing device on which method 1300 is running over a network.

At step 1420 attributes of the schema are received. In one embodiment, additional attributes of the element are specified by the user through the specification portion of the schema-creation user interface. In one embodiment, several of the attributes are specified through drop-down menus that present a selection of attribute values corresponding to an attribute of the schema element.

At step 1430 an instruction to save the schema is received. The schema may be saved to computer-storage media that is local or remote form the computing device performing method 1400. At step 1440 input describing a feed location for the feed that is to be validated against the schema is received. As described previously, the input may be received by a user typing an HTTP address into a user interface. In another embodiment, the location is described by selecting a location from a menu. In either case, the location may be local or remote to the computing device performing the method 1400.

At step 1450, a request to validate the feed against the schema is received. In one embodiment, the request includes a user pushing a button through a validation interface. At Step 1460, the feed is determined to conform to requirements of the schema. Accordingly, the feed is validated. In one embodiment, if the feed is not validated, error messages may be sent to the user. The error messages may specify the line of feed that did not conform with the requirements of the schema as well as a description of the error. At step 1470, a validation confirmation is displayed.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-readable hardware storage devices having computer-executable instructions embodied thereon for performing a method of validating an Really Simple Syndication ("RSS") feed against a schema, the method comprising:

receiving input from a user describing a feed location for the RSS feed that is to be validated; displaying a selection interface that displays a plurality of schemas used by a content provider to display the RSS feed content through a website operated by the content provider;

receiving a selection from the user of a schema against which the RSS feed is to be validated, wherein the selection of the schema occurs when the user selects one of the plurality of schemas displayed on the selection interface;

receiving a request from the user to validate the RSS feed against the schema;

validating the RSS feed against the schema in response to receiving the request from the user to validate the RSS feed against the schema by determining that the RSS feed conforms to requirements of the schema;

based on validating the RSS feed against the schema, displaying one or more of a plurality of display templates configured for use with the RSS feed that has been validated against the schema, wherein the one or more of the plurality of display templates may be selected by a user through a user interface;

receiving a selection from the user of a display template from the plurality of display templates; and indicating to the user that the RSS feed has been successfully validated against the schema by displaying at least a portion of feed content from the RSS feed in a representation that is based on the display template selected by the user that utilizes the schema, wherein the representation includes only the feed content corresponding to one or more fields of feed content selected by the user for display.

2. The devices of claim 1, wherein the feed location is an HTTP address.

3. The devices of claim 1, wherein the method further includes:
  prior to said determining, receiving a request to view the schema; and
  displaying the schema.

4. The devices of claim 1, wherein the display template is a generic template, and wherein the method further includes:
  displaying a user interface that displays fields of the feed content with a selection box adjacent to each of the fields; and receiving a selection of the one or more fields through the selection box to which the one or more fields are adjacent.

5. One or more computer-readable hardware storage devices having computer-executable instructions embodied thereon that when executed perform a method of creating and validating schema for a Really Simple Syndication ("RSS") feed, the method including:
  displaying a schema-creation user interface that includes a specification portion through which one or more elements are received;
  receiving, through the specification portion, an instruction from the user to add the one or more elements to the schema;
  receiving an instruction to save the schema with the one or more elements added to the schema for display in a selection interface that displays a plurality of schemas used by a content provider to display the feed content through a website operated by the content provider;
  receiving input describing a feed location for a feed that is to be validated against the schema;
  receiving a request from the user to validate the feed against the schema;
  based on receiving the request from the user to validate the feed against the schema validating the feed against the schema by determining that the feed conforms to requirements of the schema;
  based on validating the feed, displaying one or more of a plurality of display templates configured for use with the feed that has been validated, wherein the one or more of the plurality of display templates may be selected by a user through a user interface;
  receiving a selection from the user of a display template from the plurality of display templates; and
  indicating to a user that the feed has been successfully validated against the schema by displaying at least a portion of feed content from the feed in a representation that is based on the display template selected by the user that utilizes the schema, wherein the representation includes only the feed content corresponding to one or more fields of feed content selected by the user for display.

6. The devices of claim 5, wherein the specification portion includes at least one drop-down menu through which at least one attribute associated with the schema is specified.

7. The devices of claim 5, wherein the method further includes displaying a user interface through which one of a plurality of display templates may be selected; and receiving a selection of one of the plurality of display templates.

8. The devices of claim 5, wherein the display template is a generic template, and wherein the method further includes:
  displaying a user interface that displays fields of the feed content with a selection box adjacent to each of the fields; and receiving a selection of the one or more fields through the selection box to which the one or more fields are adjacent.

9. A method of validating an Really Simple Syndication ("RSS") feed against a schema, the method comprising:
  receiving input from a user describing a feed location for the RSS feed that is to be validated; displaying a selection interface that displays a plurality of schemas used by a content provider to display the RSS feed content through a website operated by the content provider;
  receiving a selection from the user of a schema against which the RSS feed is to be validated, wherein the selection of the schema occurs when the user selects one of the plurality of schemas displayed on the selection interface;
  receiving a request from the user to validate the RSS feed against the schema;
  validating the RSS feed against the schema in response to receiving the request from the user to validate the RSS feed against the schema by determining that the RSS feed conforms to requirements of the schema;
  based on validating the RSS feed against the schema, displaying one or more of a plurality of display templates configured for use with the RSS feed that has been validated against the schema, wherein the one or more of the plurality of display templates may be selected by a user through a user interface;
  receiving a selection from the user of a display template from the plurality of display templates; and
  indicating to the user that the RSS feed has been successfully validated against the schema by displaying at least a portion of feed content from the RSS feed in a representation that is based on the display template selected by the user that utilizes the schema, wherein the representation includes only the feed content corresponding to one or more fields of feed content selected by the user for display.

10. The method of claim 9, wherein the feed location is an HTTP address.

11. The method of claim 9, wherein the method further includes:
  prior to said determining, receiving a request to view the schema; and displaying the schema.

12. The method of claim 9, wherein the display template is a generic template, and wherein the method further includes:
  displaying a user interface that displays fields of the feed content with a selection box adjacent to each of the fields; and receiving a selection of the one or more fields through the selection box to which the one or more fields are adjacent.

* * * * *